United States Patent [19]
Hirota et al.

[11] Patent Number: 6,103,830
[45] Date of Patent: Aug. 15, 2000

[54] IMPACT RESISTANT METHACRYLIC RESIN CONTAINING A PARTIALLY HYDROGENATED, CONJUGATED DIENE POLYMER

[75] Inventors: Satoru Hirota; Masahiro Sasagawa; Hideo Kinoshita, all of Yokohama, Japan

[73] Assignee: Asahi Kasei Kogyo Kabushiki Kaisha, Osaka, Japan

[21] Appl. No.: 08/930,697

[22] PCT Filed: Apr. 12, 1996

[86] PCT No.: PCT/JP96/01025

§ 371 Date: Oct. 9, 1997

§ 102(e) Date: Oct. 9, 1997

[87] PCT Pub. No.: WO96/32440

PCT Pub. Date: Oct. 17, 1996

[30] Foreign Application Priority Data

Apr. 14, 1995 [JP] Japan ................... 7-089606

[51] Int. Cl.⁷ ................ C08F 279/02; C08F 220/14; C08F 2/00
[52] U.S. Cl. ................ 525/310; 526/201; 526/328.5
[58] Field of Search .............. 525/310; 526/201, 526/328.5

[56] References Cited

U.S. PATENT DOCUMENTS 5,998,554  12/1999  Yokoo ................... 526/328.5

FOREIGN PATENT DOCUMENTS

| 46-18491 | 5/1971 | Japan . |
|---|---|---|
| 55-27576B2 | 7/1980 | Japan . |
| 55-123612A | 9/1980 | Japan . |
| 55 147514A | 11/1980 | Japan . |
| 58-1694B2 | 1/1983 | Japan . |
| 59-36645B2 | 9/1984 | Japan . |
| 59-36646B2 | 9/1984 | Japan . |
| 62-41241B2 | 9/1987 | Japan . |
| 63 8983B2 | 2/1988 | Japan . |
| 12 97413A | 11/1989 | Japan . |
| 22-69138A | 11/1990 | Japan . |
| 23 02459A | 12/1990 | Japan . |
| 31 99213A | 8/1991 | Japan . |
| 32 95643A | 12/1991 | Japan . |
| 7-252329 | 10/1995 | Japan . |

OTHER PUBLICATIONS

Derwent Abstract for EP 60042 A which corresponds to JP 63–8983.
Derwent Abstract for EP 19372 A which corresponds to JP 55–147514.
Derwent Abstract for EP 14574 A which corresponds to JP 55–123612.
Derwent Abstract for USP 4,180,529 A which corresponds to JP 62–41241.
Derwent Abstract for JP 53058554 A which corresponds to JP 58–1694.
Derwent Abstract for JP 52056150 A which corresponds to JP 59–36646.
Derwent Abstract for DE 2619922 which corresponds to JP 59–36645.

*Primary Examiner*—Donald R. Wilson
*Attorney, Agent, or Firm*—Birch, Stewart, Kolasch & Birch, LLP

[57] ABSTRACT

A methacrylic resin having excellent impact resistance which is industrially more usable in general purposes, has the excellent weatherability and surface gloss inherent in methacrylic resins, and is optionally excellent in transparency and other properties. The impact-resistant methacrylic resin is characterized by being constituted of (A) a partially hydrogenated conjugated diene polymer having a degree of hydrogenation of from 20% to 70%, excluding 70%, and (B) a methacrylic copolymer formed from from 80 to 99.9% by weight-methyl methacrylate and from 0.1 to 20% by weight at least one other vinyl monomer-copolymerizable with the methyl methacrylate, and by having a toluene-insoluble content of from 0.5 to 50% by weight and a degree of swelling in toluene of from 2 to 12.

10 Claims, 1 Drawing Sheet

IMPACT RESISTANT METHACRYLIC RESIN CONTAINING A PARTIALLY HYDROGENATED, CONJUGATED DIENE POLYMER

TECHNICAL FIELD

The present invention relates to a methacrylic resin having excellent impact resistance. More particularly, the present invention relates to a methacrylic resin which has improved impact resistance, while it retains the excellent weatherability, surface gloss, rigidity, and brightness of color tone inherent in methacrylic resins and optionally further retains transparency and other properties.

BACKGROUND ART

Methacrylic resins are used in a wide range of indoor and outdoor applications because they are excellent in weatherability, rigidity, and molding appearance. However, since methacrylic resins are brittle polymers in themselves, there are cases where they arise troubles due to their insufficient impact resistance according to the ways in which they are used.

Investigations on improvements in the impact resistance of methacrylic resins have been made from long ago. Known techniques for the improvements include: a method in which an acrylic rubber having a multilayer structure is blended with a methacrylic resin (Examined Japanese Patent Publication No. 55-27576, Unexamined Published Japanese Patent Application No. 3-199213, and Examined Japanese Patent Publications Nos. 58-1694, 59-36645, 59-36646, 63-8983, and 62-41241); a method in which monomers containing methyl methacrylate as the main component are graft-polymerized with a conjugated diene polymer (Examined Japanese Patent Publication No. 46-18491 and Unexamined Published Japanese Patent Applications Nos. 55-147514 and 55-123612); and a method in which monomers containing methyl methacrylate as the main component are graft-polymerized with a rubber-like polymer obtained from either a copolymer of an aromatic vinyl compound and a conjugated diene or a conjugated diene polymer by hydrogenating at least 70%, substantially at least 90%, of the olefinically unsaturated bonds, i.e., double bonds, thereof (Unexamined Published Japanese Patent Applications Nos. 1-297413, 2-302459, and 3-295643).

The first method, in which an acrylic rubber having a multilayer structure is blended with a methacrylic resin, is the technique currently most extensively used industrially. The multilayered acrylic rubber has a spherical structure made up of three or more layers comprising, stacked substantially alternately, rigid layers made mainly from methyl methacrylate and flexible layers made mainly from an acrylic ester such as butyl acrylate. The degree of crosslinking of the flexible layers, in particular, is controlled by changing polyfunctional monomers. A feature of this blending technique resides in that since the flexible layers have been sufficiently crosslinked, the rubber particles are neither deformed nor broken by the mechanical shearing force which the particles receive during extrusion or injection molding. Although this method is an excellent technique for improving a performance, i.e., impact resistance, of methacrylic resins, it has problems including the following. Since the rubber ingredient has a multilayer structure containing rigid layers, it is necessary to add the rubber ingredient in a large amount for obtaining the desired impact resistance. Moreover, since multistage polymerization should be conducted repeatedly in forming the multilayer structure, the production efficiency is low, resulting in an increased cost.

The second method, in which monomers containing methyl methacrylate as the main component are graft-polymerized with a conjugated diene polymer, is characterized in that since the rubber ingredient contains a large amount of double bonds, it undergoes crosslinking reactions like the rubber ingredients in ABS resins and high-impact polystyrenes and, hence, the rubber particles are neither deformed nor broken by the mechanical shearing force which the particles receive during extrusion or injection molding. In addition, the second method is excellent also in cost because the production efficiency is high. However, this technique has problems, for example, in that the rubber ingredient contains a large amount of double bonds which are unstable to light. As a result weatherability inherent in methacrylic resins is reduced considerably and, hence, the final resin cannot be used in outdoor applications.

The third method, in which monomers containing methyl methacrylate as the main component are graft-polymerized with a rubber-like polymer obtained by hydrogenating either a copolymer of an aromatic vinyl compound and a conjugated diene or a conjugated diene polymer, is not always superior to the second method in that when the rubber ingredient used is a hydrogenated copolymer of an aromatic vinyl compound and a conjugated diene, the final resin has poor weatherability because it undergoes yellowing, etc. in outdoor use due to the aromatic vinyl compound. On the other hand, in the case where a hydrogenated conjugated diene polymer is used as the rubber ingredient, the final resin tends to have improved weatherability because the rubber ingredient has a smaller amount of double bonds as compared with that in the second method. However, since at least 70%, substantially at least 90%, of the double bonds in the conjugated diene polymer have been hydrogenated, namely, since the rubber has a reduced amount of double bonds, the crosslinking reaction of the rubber ingredient does not proceed and, hence, the rubber particles are deformed or broken by the mechanical shearing force which the particles receive during extrusion or injection molding. As a result, this technique has problems, for example, in that molded articles usually have a poor surface gloss and are apt to have an appearance similar to that of ground glass according to molding conditions, or that the resin gives a molded article in which the gate part differs from the front part in surface gloss and which hence has poor evenness in gloss. Thus, this third method is not a practically usable technique for improving the impact resistance of methacrylic resins required to have an attractive surface.

Many proposals such as those described above have been made in order to impart impact resistance to methacrylic resins. However, no technique for improving impact resistance has been found with which an impact-resistant methacrylic resin having the excellent properties inherent in methacrylic resins can be produced highly efficiently at low cost.

An object of the present invention is to provide a methacrylic resin having excellent impact resistance which is industrially more usable in general purposes, retains the excellent weatherability and surface gloss inherent in methacrylic resins, and is optionally excellent in transparency and other properties.

DISCLOSURE OF THE INVENTION

The present inventors made intensive investigations on techniques for improving the impact resistance of methacrylic resins. As a result, they have found that an impact-resistant methacrylic resin which gives molded articles having evenness in surface gloss regardless of differences in molding conditions and which has the excellent properties inherent in methacrylic resins can be obtained by polymerizing monomers containing methyl methacrylate as the main component by the solution polymerization method in the presence of a rubber ingredient which is a partially hydrogen-added (hereinafter referred to as "partially hydrogenated") conjugated diene polymer, specifically, a partially hydrogenated conjugated diene polymer having a degree of hydrogenation of from 20% to 70%, excluding 70%, and then conducting volatilization to cause the rubber ingredient to undergo crosslinking reactions and thereby make the resultant resin to have a toluene-insoluble content and a degree of swelling in toluene both in respective given ranges. It has further been found that an impact-resistant methacrylic resin also having excellent transparency can be obtained by regulating the degree of hydrogenation of the conjugated diene polymer so that the partially hydrogenated conjugated diene polymer and the methacrylic copolymer yielded through polymerization have the same refractive index. The present invention has been completed based on these findings.

The present invention relates to an impact-resistant methacrylic resin characterized by being constituted of a partially hydrogenated conjugated diene polymer, as component (A), having a degree of hydrogenation of from 20% to 70%, excluding 70%, and a methacrylic copolymer, as component (B), formed from from 80 to 99.9% by weight methyl methacrylate and from 0.1 to 20% by weight at least one other vinyl monomer copolymerizable with the methyl methacrylate, and by having a toluene-insoluble content of from 0.5 to 50% by weight and a degree of swelling in toluene of from 2 to 12, component (A) being dispersed as fine particles in component (B) as a matrix.

The present invention will be explained below in detail.

A characteristic feature of the present invention resides in that a partially hydrogenated conjugated diene polymer having excellent reactivity in grafting and crosslinking is used as a rubber ingredient. Used as the partially hydrogenated conjugated diene polymer is a polymer obtained by partially hydrogenating either a homopolymer of any of conjugated dienes such as butadiene, isoprene, pentadiene, and 2,3-dimethylbutadiene or a copolymer of at least two of these conjugated diene monomers. Especially preferred of these is a partially hydrogenated butadiene polymer because of its high economical advantage. The degree of hydrogenation of the partially hydrogenated conjugated diene polymer is from 20% to 70%, excluding 70%, preferably from 30% to 70%, excluding 70%, more preferably from 50% to 70%, excluding 70%. If the degree of hydrogenation of the polymer is lower than 20%, the impact-resistant methacrylic resin has poor weatherability. Conversely, if the degree of hydrogenation thereof exceeds 70%, reactivity in grafting and especially in crosslinking considerably decreases abruptly. The hydrogenation is accomplished, for example, by the method disclosed in Examined Japanese Patent Publication No. 5-20442. However, methods for the hydrogenation should not be construed as being limited thereto.

Other properties of the conjugated diene polymer are as follows. In the case of a butadiene polymer, the amount of side-chain vinyl groups in the unhydrogenated conjugated diene polymer is preferably from 10 to 80% in terms of 1,2-vinyl content. Furthermore, in the case of a butadiene polymer, a hydrogenated conjugated diene polymer containing a larger amount of remaining side-chain vinyl groups, i.e., a higher remaining 1,2-vinyl content, is advantageous from the standpoint of reactivity in grafting and crosslinking. The larger the amount of side-chain vinyl groups in an unhydrogenated conjugated diene polymer, the larger the amount of side-chain vinyl groups remaining in the conjugated diene polymer after hydrogenation. Even when unhydrogenated conjugated diene polymers having the same amount of side-chain vinyl groups are hydrogenated, the hydrogenated polymers differ in the amount of remaining side-chain vinyl groups according to the reaction conditions used for the hydrogenation. In general, lower reaction temperatures tend to result in larger amounts of remaining side-chain vinyl groups. The amount of side-chain vinyl groups present in the hydrogenated conjugated diene polymer is usually preferably 1% or larger, more preferably 5% or larger. Use of an unhydrogenated conjugated diene polymer having a side-chain vinyl content of 10% or lower is undesirable in that the resultant hydrogenated conjugated diene polymer has too small an amount of remaining side-chain vinyl groups and tends to less undergo grafting and crosslinking reactions. On the other hand, use of an unhydrogenated polymer having a side-chain vinyl content of larger than 80% is undesirable in that the impact-resistant methacrylic resin obtained tends to have reduced impact resistance. An important factor which governs reactivity in grafting and crosslinking is the degree of hydrogenation of the partially hydrogenated conjugated diene polymer as described above; it is important that the degree of hydrogenation thereof be regulated to below 70%. Another factor governing reactivity in grafting and crosslinking is the amount of side-chain vinyl groups remaining after hydrogenation. A partially hydrogenated conjugated diene polymer in which the amount of side-chain vinyl groups remaining after hydrogenation is smaller than 1% tends to undergo less grafting and crosslinking reactions even when the degree of hydrogenation thereof is lower than 70%. The weight-average molecular weight of the hydrogenated conjugated diene polymer is preferably from 30,000 to 500,000, more preferably from 50,000 to 300,000. If the weight-average molecular weight thereof is lower than 30,000, impact resistance is reduced. Conversely, if the weight-average molecular weight thereof is larger than 500,000, the rubber solution has an exceedingly high viscosity during the production of an impact-resistant methacrylic resin, making it highly difficult to dissolve the feedstock rubber. The structure of the conjugated diene polymer may be either linear or branched.

The impact-resistant methacrylic resin of the present invention gives molded articles having evenness in surface gloss regardless of fluctuations of molding conditions, especially because of the rubber particles which have been moderately crosslinked and hence suffer no deformation under shearing during molding. Moreover, since the rubber particles have a moderate amount of methyl methacrylate grafted onto the surface thereof, the methacrylic resin has high impact resistance and sufficiently high compatibility between the rubber particles and the methacrylic copolymer, suffers neither rubber particle aggregation nor delamination under shearing during molding, and undergoes neither cracking nor a considerable decrease in impact resistance upon outdoor exposure because of the stable interface between the rubber particles and the methacrylic copolymer. Although it is not virtually easy to directly specify the degree of crosslinking of the rubber particles and the degree of grafting, these properties can be indirectly specified in terms of insoluble content in fractionation with toluene and of the degree of swelling in toluene. The toluene-insoluble content mainly indicates the amount of rubber particles which have undergone crosslinking and grafting. More particularly, it indicates the total amount of a crosslinked rubber, a grafted methyl methacrylate copolymer, and a methyl methacrylate copolymer confined in rubber particles which have undergone crosslinking/grafting. This toluene-insoluble content should be from 0.5 to 50% by weight. If the toluene-insoluble content of the methacrylic resin is lower than 0.5% by weight, impact resistance is low. If the toluene-insoluble content thereof exceeds 50% by weight, the resin has considerably reduced rigidity and exceedingly reduced flowability in processing. The degree of swelling in toluene is defined as the amount of toluene which can be contained in the toluene-insoluble components. Toluene-insoluble components which have been crosslinked to a low level swell and contain a larger amount of toluene, resulting in a high degree of swelling in toluene. Consequently, the degree of swelling in toluene can be used as a measure of the degree of crosslinking of the rubber particles. This degree of swelling in toluene should be from 2 to 12, preferably from 3 to 10. In general, lower degrees of swelling in toluene tend to be preferred from the standpoint of surface gloss and other properties. If the degree of swelling in toluene exceeds 12, the degree of crosslinking of the rubber particles is insufficient and molded articles have a poor surface gloss undesirable for practical use. Conversely, if the degree of swelling in toluene is below 2, the degree of crosslinking is so high that the methacrylic resin has poor impact resistance.

On the other hand, the impact-resistant methacrylic resin of the present invention can have excellent transparency. For attaining this, the partially hydrogenated conjugated diene polymer is regulated so as to have the same refractive index as the methacrylic copolymer, and the toluene-insoluble content and the degree of swelling in toluene are regulated to from 0.5 to 50% by weight and from 2 to 12, respectively. In this case, the difference in refractive index between the partially hydrogenated conjugated diene polymer and the methacrylic copolymer is regulated to 0.02 or smaller, preferably 0.01 or smaller. From the standpoint of reactivity in crosslinking and grafting, a lower degree of hydrogenation is advantageous to the partially hydrogenated conjugated diene polymer having the same refractive index as the methacrylic copolymer. However, the degree of hydrogenation thereof varies depending on the conditions under which a conjugated diene polymer is hydrogenated. For example, a conjugated diene polymer hydrogenated at a low temperature can have a lower degree of hydrogenation than those hydrogenated at higher temperatures, when regulated so as to have the same refractive index as the methacrylic copolymer. More specifically, a butadiene polymer which has been partially hydrogenated at a low temperature can be made to have the same refractive index as the methacrylic copolymer when it has a degree of hydrogenation of about 60%. An impact-resistant methacrylic resin obtained using this rubber gives injection-molded articles in which the rubber particles have satisfactorily undergone crosslinking reactions and which have an excellent surface gloss and a haze of 8 or lower. Satisfactory ones among these have excellent transparency with a haze of 5 or lower, and have almost the same properties as ordinary methacrylic resins. In order to produce an impact-resistant methacrylic resin excellent in surface gloss and transparency, that is, in order for a butadiene polymer to have excellent reactivity in grafting and crosslinking and to come to have the same refractive index as the methacrylic copolymer serving as a matrix, the butadiene polymer is preferably hydrogenated at a temperature of 100° C. or lower. In order for the partially hydrogenated conjugated diene polymer to have the same refractive index as the methacrylic copolymer, it should usually have a degree of hydrogenation not lower than 50%. Consequently, in order for the partially hydrogenated conjugated diene polymer to have satisfactory reactivity in grafting and crosslinking and to give a transparent impact-resistant methacrylic resin, the degree of hydrogenation thereof is from 50% to 70%, excluding 70%.

A process for producing the impact-resistant methacrylic resin of the present invention will be explained below.

The impact-resistant methacrylic resin of the present invention is produced by polymerizing monomers containing methyl methacrylate as the main component by the solution polymerization method in the presence of a partially hydrogenated conjugated diene polymer and volatilizing the solvent and unreacted monomers after completion of the polymerization. The partially hydrogenated conjugated diene polymer for use in the present invention, when regulated so as to have a degree of hydrogenation lower than 70%, satisfactorily undergoes crosslinking reactions. It is possible to attain a preferred degree of swelling in toluene by employing adequate production conditions so as to further accelerate the crosslinking reactions.

In general, the partially hydrogenated conjugated diene polymer and methyl methacrylate are poorly soluble or insoluble in each other. It is therefore impossible to employ the technique ordinarily used for producing high-impact polystyrenes and the like in which a feedstock rubber is dissolved in a monomer and the resultant solution is continuously fed to a polymerizer. Consequently, the solvent used for the polymerization in the present invention is preferably a solvent in which both the partially hydrogenated conjugated diene polymer and the copolymer made mainly from methyl methacrylate can dissolve. Examples of such a preferred solvent include aromatic hydrocarbons such as benzene, toluene, and ethylbenzene. However, the solvents usable in the present invention are not limited to these. Larger solvent amounts are preferred in that dissolution of the partially hydrogenated conjugated diene polymer is easy and the polymerization system has a reduced viscosity, which is advantageous to polymerization operation. However, too large solvent amounts are undesirable in that not only a reduced production efficiency results, but also the solvent is more apt to undergo a chain transfer reaction to inhibit grafting and crosslinking reactions. The preferred range of the solvent amount in the present invention is from 20 to 80% by weight when charged.

A polymerization initiator comprising a generally known organic peroxide is preferably used. The polymerization initiator is more preferably either an organic peroxide having a one-minute half-life temperature of from 130 to 200° C. or a combination of an organic peroxide having a one-minute half-life temperature of from 100 to 160° C. and an organic peroxide having a one-minute half-life temperature of 160° C. or higher, because use of this initiator is effective in accelerating the crosslinking and grafting reactions of the rubber ingredient. In the case where multistage polymerization is conducted, it is possible to accelerate the crosslinking and grafting reactions by additionally adding a polymerization initiator in the latter stage. Examples of the organic peroxide having a one-minute half-life temperature of from 130 to 200° C. include benzoyl peroxide, 1,1-bis(t-butylperoxy)-3,3,5-trimethylcyclohexane, t-butyl peroxylaurate, t-butyl peroxyisopropylcarbonate, 2,5-dimethyl-2,5-di(benzoylperoxy)hexane, t-butyl peroxybenzoate, dicumyl peroxide, t-butyl cumyl peroxide, di-t-butyl peroxide, α,α'-bis(t-butylperoxy) diisopropylbenzene, 2,5-dimethyl-2,5-di(t-butylperoxy) hexane, and 2,5-dimethyl-2,5-di(t-butylperoxy)hexyne-3.

The use amount of the polymerization initiator is preferably from 0.05 to 2% by weight in terms of the total amount.

A preferred chain transfer agent is an alkyl mercaptan. In particular, a polyfunctional alkyl mercaptan having two or more mercapto groups is more preferred because it tends to accelerate the crosslinking reaction of the rubber ingredient. Examples of the alkyl mercaptan include n-dodecyl mercaptan, t-dodecyl mercaptan, 1,4-butanediol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris($\beta$-thiopropionate), and pentaerythritol tetrakisthiopropionate.

The polymerization temperature is preferably elevated in the range of from 80 to 180° C. in two or more stages with the progress of the polymerization reaction.

A single reactor or a multistage polymerizer is used to conduct the polymerization reaction either batch-wise or continuously. The batch-wise polymerization is conducted, for example, in the following way. A partially hydrogenated diene polymer and a solvent are charged to a polymerizer, and the polymer is dissolved at an appropriate temperature. Thereafter, the polymerizer is set at a desired temperature, and a monomer mixture containing dissolved therein an organic peroxide, a chain transfer agent, etc. is continuously introduced into the polymerizer to polymerize the monomers. The continuous polymerization is conducted, for example, in the following way. One tank is used to dissolve a partially hydrogenated diene polymer in a solvent, while the other tank is used to prepare a monomer mixture. The polymer solution and the monomer mixture are continuously fed in a constant proportion to a polymerizer to conduct the polymerization reaction. In this case, an organic peroxide, a chain transfer agent, and the like may be introduced into the tank at one time or portion-wise.

The polymerization reaction should be controlled so that the final conversion of the monomers into polymers becomes at least 80%, preferably at least 90%. By heightening the conversion of monomers into polymers, the grafting and crosslinking reactions of the rubber ingredient are accelerated. In an ordinary polymerization method, a polymerization reaction proceeds from the initial stage in which a partially hydrogenated diene polymer is present as a solution in a mixture comprising a solvent and monomers and, at the time when a methacrylic copolymer has been yielded in a given amount, phase conversion occurs to form rubber particles. The diameter or structure of the rubber particles is determined by the conditions used at that time, e.g., the rotational speed of stirring and the viscosity of the polymerization system. The rubber particles desirably have the so-called salami-like structure, in which each rubber particle contain therein many separate particles of a methacrylic polymer phase, or a core/shell structure in which the core has a single phase. A special polymerization method using two polymerizers arranged in a row can be conducted, for example, as follows. The first reactor is used to polymerize monomers containing methyl methacrylate as the main component, while in the second reactor, monomers containing methyl methacrylate as the main component and further containing a partially hydrogenated diene polymer are polymerized and grafted to such a degree as not to result in phase conversion. Thereafter, the reaction mixture contained in the second reactor is continuously fed to the first reactor to thereby cause phase conversion and form rubber particles.

The diameter of the rubber particles is preferably in the range of from 0.05 to 2.0 $\mu$m, more preferably from 0.1 to 1.0 $\mu$m. Rubber particles having diameters smaller than 0.05 $\mu$m are undesirable in that impact resistance tends to decrease. Rubber particles having diameters exceeding 2.0 $\mu$m are undesirable in that rigidity tends to decrease. In addition, there are cases where in producing a transparent impact-resistant methacrylic resin, transparency and other properties are impaired. The structure and diameter of rubber particles can be ascertained on a photograph of the impact-resistant methacrylic resin taken with a transmission electron microscope by the ultrathin sectioning method.

After the polymerization reaction, the solvent and the monomers remaining unreacted are removed by volatilization with heating to obtain an impact-resistant methacrylic resin of the present invention. The volatilization is conducted at a temperature of preferably from 200 to 300° C., more preferably from 220 to 270° C. Temperatures of less than 200° C. are undesirable in that monomers remaining in a large amount cause problems such as silver streaks, which molded articles develop upon molding. Conversely, temperatures exceeding 300° C. are undesirable in that polymer discoloration and other troubles occur. The crosslinking reaction of the rubber ingredient may be accelerated, for example, by causing the resin to reside at a high temperature after the volatilization of the solvent and unreacted monomers. For example, the crosslinking may be accelerated by heating the resin at a temperature of from 200 to 300° C., preferably from 220 to 270° C., for 5 to 60 minutes. The crosslinking may also be accelerated by additionally adding an organic peroxide during or after the volatilization. The organic peroxide used here is preferably one which is active at high temperatures. It is generally preferred to use an organic peroxide having a one-minute half-life temperature of 160° C. or higher.

Examples of other vinyl monomers copolymerizable with methyl methacrylate include acrylic esters such as methyl acrylate, ethyl acrylate, butyl acrylate, and 2-ethylhexyl acrylate; methacrylic esters such as ethyl methacrylate, butyl methacrylate, cyclohexyl methacrylate, and t-butylcyclohexyl methacrylate; maleimide and analogues thereof such as N-cyclohexylmaleimide and N-phenylmaleimide; unsaturated carboxylic acids such as acrylic acid and methacrylic acid; and unsaturated nitriles such as acrylonitrile and methacrylonitrile. Acrylic esters are preferred from the standpoint of improving the weatherability, thermal stability, and other properties of the impact-resistant methacrylic resin to be obtained. Especially preferred of the acrylic esters are methyl acrylate and ethyl acrylate because they are currently in industrial use and inexpensive.

The use amount of the vinyl comonomers is in the range of from 0.1 to 20% by weight. Amounts thereof smaller than 0.1% by weight are undesirable in that pyrolysis is apt to occur during molding. Amounts thereof exceeding 20% by weight are undesirable in that problems arise, such as an enhanced decrease in heat deformation temperature.

The weight-average molecular weight of the methacrylic copolymer is in the range of from 50,000 to 300,000, preferably from 70,000 to 150,000. The weight-average molecular weight is determined by fractionation with acetone and examination of the soluble components by GPC. The thus-determined weight-average molecular weight is a value calculated for standard polystyrene.

As described above, the present invention relates to a methacrylic resin containing a moderately crosslinked rubber ingredient formed from a partially hydrogenated conjugated diene polymer. This methacrylic resin has improved impact resistance, while it retains weatherability, the satisfactory surface gloss of molded articles, rigidity, and brightness of color tone and further retains transparency if desired. In addition, due to the presence of the rubber ingredient in an methacrylic copolymer, the impact-resistant methacrylic resin is reduced in the deformation caused upon molding and has improved solvent resistance. If desired and necessary, additives such as, e.g., an antioxidant, ultraviolet absorber, lubricant, release agent, antistatic agent, flame retardant, and dye or pigment can be added to the impact-resistant methacrylic resin of the present invention.

Furthermore, the impact-resistant methacrylic resin of the present invention can be used after being diluted with an ordinary methacrylic resin. The impact-resistant methacrylic resin is usable also as a modifier for resins such as AS resins, ABS resins, and vinyl chloride resins.

The impact-resistant methacrylic resin thus obtained is injection-molded or extruded, whereby a molded article, a sheet, or another molding can be produced which each is excellent in weatherability, surface gloss, rigidity, and brightness of color tone and in impact resistance and solvent resistance.

BEST MODES FOR CARRYING OUT THE INVENTION

The present invention will be further explained below by reference to Examples, but the invention should not be construed as being limited thereto in any way. The following methods were used in the Examples and Comparative Examples for determining various properties and for producing hydrogenated conjugated diene polymers.

(A) Methods for Determining Various Properties (1) Melt flow index: ASTM D1238

(2) Haze: ASTM D1003

(3) Izod impact strength (notched): ASTM D256

(4) Weatherability: Izod impact strength was measured after 1,000-hour exposure in a sunshine weatherometer using a carbon-arc lamp as a light source.

(5) Weight-average particle diameter: A sample cut out of a pellet was dyed with osmium tetroxide to produce an ultrathin section, and a photograph thereof was taken with a transmission electron microscope (100,000 diameters). The diameters of arbitrarily selected 100 rubber particles were measured, and the weight-average particle diameter was calculated using the following equation.

Weight-average particle diameter=$\Sigma n_i \cdot D_i^4 / \Sigma N_i \cdot D_i^3$ ($n_i$ is the number of rubber particles having a diameter of $D_i$)

(6) Toluene-insoluble content and degree of swelling in toluene: About 1 g of pellets are precisely weighed out ($W_1$). Thereto is added 20 ml of toluene. The mixture is shaken at 25° C. for 5 hours and then centrifuged at 5° C. and 23,000 rpm for 45 minutes. The resultant supernatant is removed by decantation. Thereafter, 20 ml of toluene is added to the residue, and the mixture is shaken at 25° C. for 1 hour and then centrifuged at 5° C. and 23,000 rpm for 45 minutes. The resultant supernatant is removed by decantation, and the residue containing toluene is weighed ($W_2$). Subsequently, the residue is vacuum-dried at 100° C. for 2 hours, cooled to room temperature in a desiccator, and then weighed ($W_3$). The toluene-insoluble content (wt %) and the degree of swelling in toluene are calculated using the following equations.

Toluene-insoluble content=$(W_3/W_1) \times 100$

Degree of swelling in toluene=$W_2/W_3$ (7) Side-chain vinyl amount and degree of hydrogenation: FT-NMR spectrometry is conducted for the determination. In the case where polybutadiene is used as a conjugated diene polymer, calculations are made by the following method. In the case where other conjugated diene polymers or copolymers are used, calculations are made in the same manner as for polybutadiene.

The unhydrogenated polybutadiene is dissolved in heavy chloroform. The solution is analyzed by FT-NMR spectrometry (270 mega). The content of side-chain vinyl bonds, $V_0$ (%), is calculated using the following equation from the integrated intensity of the chemical shift at 4.7–5.2 ppm (referred to as signal $C_0$) assignable to 1,2-vinyl proton (=$CH_2$) and that of the chemical shift at 5.2–5.8 ppm (referred to as signal Do) assignable to vinyl proton (=CH—).

$$V_0=[(C_0/2)/\{C_0/2+(D_0-C_0/2)/2\}]\times 100$$

Furthermore, a partially hydrogenated polybutadiene is dissolved in heavy chloroform. In the same manner as the above, the solution is analyzed by FT-NMR spectrometry, and the amounts of side-chain vinyl groups before and after hydrogenation and the degree of hydrogenation are calculated using the following equations from the integrated intensity of the chemical shift at 0.6–1.0 ppm (referred to as signal $A_i$) assignable to methyl proton (—$CH_3$) formed by the hydrogenation of 1,2-bond, that of the chemical shift at 4.7–5.2 ppm (referred to as signal $C_1$) assignable to unhydrogenated 1,2-vinyl proton (=$CH_2$), and that of the chemical shift at 5.2–5.8 ppm (referred to as signal $D_1$) assignable to unhydrogenated vinyl proton (=CH—).

When $$f=(C_0/2)/(C_1/2+A_1/3)$$

$A_{11}=fA_1$, $C_{11}=fC_1$, and $D_{11}=fD_1$, then the degree of hydrogenation at 1,2-vinyl bonds, B (%), is:

$$B=[(A_{11}/3/(A_{11}/3+C_{11}/2)]\times 100$$

the degree of hydrogenation at 1,4-double bonds, C (%), is:

$$C=[(D_0-C_0/2)/2-(D_{11}-C_{11}/2)/(D_0-C_0/2)/2]\times 100$$

and the degree of hydrogenation of the whole polybutadiene, A is:

$$A=(V\times B+(100-V)\times C)/100.$$

The content of remaining side-chain vinyl bonds in the partially hydrogenated polybutadiene, VI, is calculated using the following equation.

$$V_1=[(C_{11}/2)/\{C_0/2)/2\}]\times 100$$

(B) Production of Partially Hydrogenated Conjugated Diene Polymers (1) Production of partially hydrogenated polybutadiene An autoclave having a capacity of 35 λ and equipped with a stirrer and a jacket was used as a polymerizer. Into the polymerizer were introduced, after replacement with nitrogen, 26 λ of a butadiene/cyclohexane solution (butadiene concentration, 9 wt %), 28 ml of an n-butyllithium/cyclohexane solution (concentration, 15 wt %), and 8.6 ml of an N,N,N',N'-tetramethylethylenediamine/cyclohexane solution (concentration, 39 wt %). Polymerization was conducted batch-wise at 60° C. After completion of the polymerization, 10 ml of a silicon tetrachloride/cyclohexane solution (concentration, 18 wt %) was added to conduct a coupling reaction. Further, a di-p-trisbis(1-cyclopentadienyl)titanium/cyclohexane solution as a hydrogenation catalyst and hydrogen were added to conduct a hydrogenation reaction at a given temperature.

To the thus-obtained solution of a partially hydrogenated polybutadiene was added 2,6-di-t-butylhydroxytoluene as an antioxidant in an amount of 0.5 parts by weight per the polymer. The solvent was removed. Partially hydrogenated polybutadienes having different degrees of hydrogenation were obtained using various hydrogenation temperatures, and are shown in Table 1 as H-1 to H-8. A polybutadiene (H-0) was also produced which had undergo no hydrogenation reaction. Polybutadiene H-0 had a 1,2-vinyl content (amount of side-chain vinyl groups) of 51%. The 1,2-vinyl contents (amounts of side-chain vinyl groups) after partial hydrogenation are shown in Table 1.

TABLE 1

| Partially hydrogenated polybutadiene | Hydrogenation temperature (° C.) | Degree of hydrogenation (%) | 1,2-Vinyl content (%) | Refractive index |
| --- | --- | --- | --- | --- |
| H-1 | 55 | 59 | 9 | 1.492 |
| H-2 |  | 71 | 6 | 1.489 |
| H-3 | 60 | 65 | 6 | 1.491 |
| H-4 | 80 | 65 | 4 | 1.492 |
| H-5 | 120 | 69 | 1 | 1.494 |
| H-6 |  | 73 | 1 | 1.493 |
| H-7 |  | 59 | 6 | 1.496 |
| H-8 |  | 30 | 18 | 1.505 |

(2) Production of partially hydrogenated poly(butadiene/isoprene)

A butadiene/isoprene copolymer was produced and hydrogenated in the same manner as for partially hydrogenated polybutadiene H-1 described above, except that butadiene was replaced by butadiene/isoprene=80/20 (by weight). Thus, a partially hydrogenated poly(butadiene/isoprene) (H-9) having a degree of hydrogenation of 60% was produced.

EXAMPLE 1

The atmosphere in a rubber-dissolving vessel having a capacity of 40 λ was replaced with nitrogen. Into this vessel were introduced 20.0 kg of toluene, 2.7 kg of a partially hydrogenated polybutadiene (H-1), 23 g of 1,1-bis(t-butylperoxy)-3,3,5-trimethylcyclohexane (hereinafter referred to as catalyst P-1), and 65 g of trimethylolpropane tris(β-thiopropionate) (hereinafter referred to as chain transfer agent TMTP). The contents were stirred at 50° C. for dissolution to prepare a rubber solution. On the other hand, the atmosphere in a monomer-mixing vessel having a capacity of 30 λ was replaced with nitrogen. To this mixing vessel were introduced 23.4 kg of methyl methacrylate, 0.6 kg of methyl acrylate, and 47 g of di-t-butyl peroxide (hereinafter referred to as catalyst P-2). The contents were stirred at 10° C. for dissolution to prepare a monomer mixture.

The rubber solution and monomer mixture thus obtained were continuously fed to a mixing vessel having a capacity of 0.2 λ, and then sent for polymerization to two laminar-flow polymerizers having a capacity of 4 λ connected in series. The rubber solution and the monomer mixture were fed at rates of 0.65 λ/hr and 0.65 λ/hr, respectively. The temperature inside the first-stage mixing vessel was maintained at 100° C., and the stirring speed therein was regulated to 200 rpm. The temperature inside the second-stage laminar-flow polymerizer was maintained at 120° C., and the stirring speed therein was regulated to 100 rpm. The temperature inside the third-stage laminar-flow polymerizer was maintained at 150° C., and the stirring speed therein was regulated to 50 rpm. The resultant reaction mixture was treated for about 5 minutes with a volatilizing apparatus connected to the third-stage laminar-flow reactor and set at 250° C. and 30 Torr to thereby remove the solvent and the remaining monomers. The residue was pelletized with an extruder to obtain an impact-resistant methacrylic resin.

The conversion of the monomers into polymers was calculated based on a comparison between the raw-material feed amounts per hour and the weight of the resin obtained. As a result, the conversion thereof was found to be 96%. The rubber content in the impact-resistant methacrylic resin was 10.5%.

The resin obtained had a toluene-insoluble content of 24.1% by weight and a degree of swelling in toluene of 6.5. The weight-average particle diameter was 0.36 μm.

This resin had a melt flow index of 1.7 g/10 min, and gave injection-molded test pieces having an excellent and even surface gloss. The Izod impact strength thereof was 8.5 kg·cm/cm, and the haze thereof was 1.5%.

Test pieces obtained by injection molding were subjected to a weathering test. The Izod impact strength thereof after 1,000-hour exposure was 8.2 kg·cm/cm. The retention of impact strength was 96%.

EXAMPLES 2 TO 7 AND COMPARATIVE EXAMPLES 1 TO 3

Rubbers which differed in degree of hydrogenation and refractive index were used as starting materials to conduct a polymerization reaction under the same conditions as in Example 1. Properties of the impact-resistant methacrylic resins obtained are shown in Table 2.

TABLE 2

| | Unit | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|---|
| Rubber Kind | | | | | | | | | | | |
| No. | | H-1 | H-3 | H-4 | H-5 | H-7 | H-8 | H-9 | H-2 | H-6 | H-0 |
| Degree of hydrogenation | % | 59 | 65 | 65 | 69 | 59 | 30 | 60 | 71 | 73 | 0 |
| 1,2-Vinyl content | % | 9 | 6 | 4 | 1 | 6 | 18 | - | 6 | 1 | 51 |
| Refractive index | | 1.492 | 1.491 | 1.492 | 1.494 | 1.496 | 1.505 | 1.494 | 1.489 | 1.493 | 1.518 |
| Polymerization | | | | | | | | | | | |
| Rubber monomers fed | | 10/90 | 10/90 | 10/90 | 10/90 | 10/90 | 10/90 | 10/90 | 10/90 | 10/90 | 10/90 |
| Conversion of monomers | % | 96 | 97 | 97 | 96 | 95 | 96 | 95 | 95 | 96 | 97 |
| Rubber content after polyamerization | % | 10.5 | 10.3 | 10.3 | 10.4 | 10.5 | 10.4 | 10.5 | 10.5 | 10.4 | 10.3 |
| Properties | | | | | | | | | | | |
| Weight-average rubber particle diameter | $\mu$ | 0.36 | 0.35 | 0.34 | 0.37 | 0.37 | 0.38 | 0.36 | 0.34 | 0.37 | 0.40 |
| Toluene-insoluble content | % | 24.1 | 23.2 | 21.3 | 21.5 | 23.5 | 26.8 | 25.3 | 21.2 | 19.8 | 29.3 |
| Degree of swelling in toluene | % | 6.5 | 7.3 | 11.3 | 11.8 | 7.0 | 6.0 | 6.2 | 13.5 | 14.1 | 5.8 |
| Material Properties | | | | | | | | | | | |
| MFR | g/10 min | 1.7 | 1.6 | 1.6 | 1.7 | 1.7 | 1.6 | 1.8 | 1.8 | 1.7 | 1.6 |
| Surface gloss (visual examination) | | ⊚ | ⊚ | ○ | ○ | ⊚ | ⊚ | ⊚ | Δ | x | ○ |
| Haze | % | 1.5 | 1.8 | 4.0 | 5.2 | 3.9 | - | 1.7 | 8.5 | 10.2 | - |
| Izod impact strength | kg.cm/cm | 8.5 | 7.2 | 6.5 | 4.6 | 8.3 | 9.0 | 8.0 | 5.2 | 4.0 | 9.8 |
| Weatherability (retention) | % | 96 | 97 | 97 | 98 | 96 | 89 | 96 | 98 | 98 | 46 |

Figure 1:
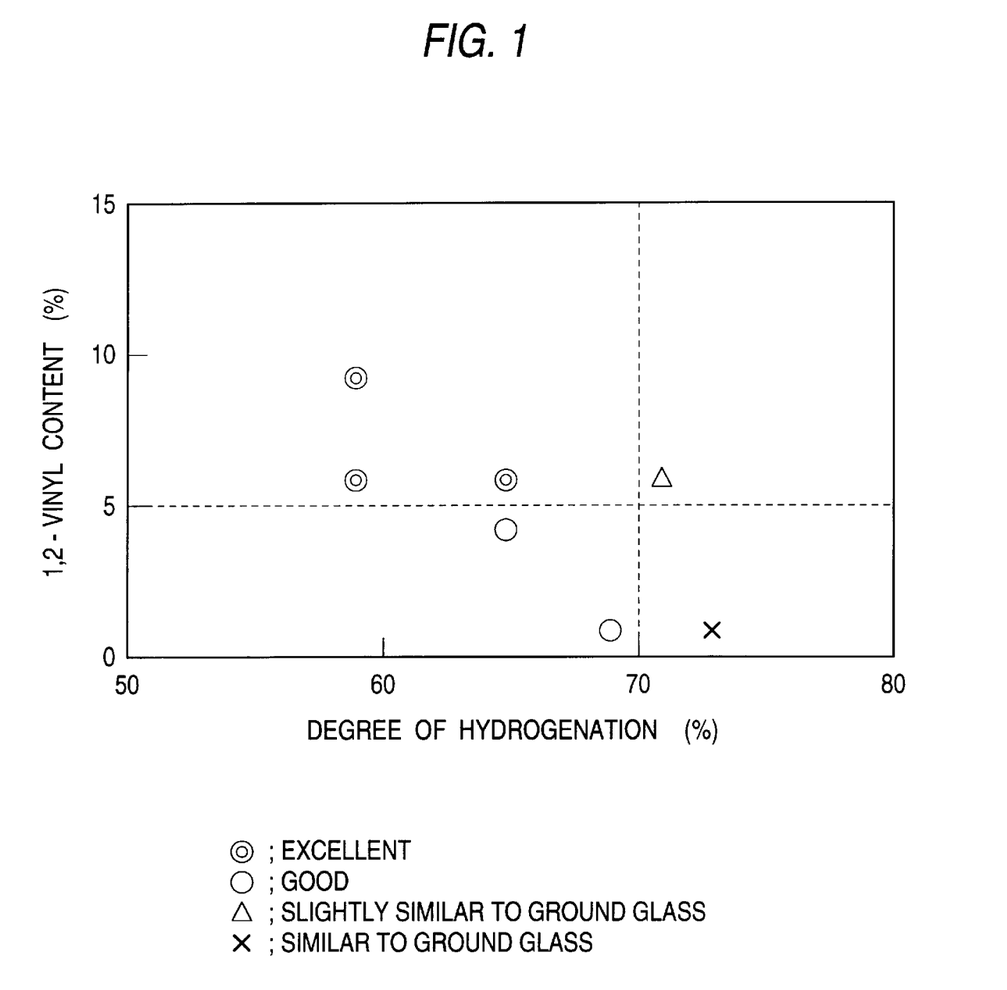
FIG. 1 is a graph illustrating the relationship between the surface gloss of injection-molded test pieces of impact-resistant methacrylic resins according to the present invention and the degree of hydrogen addition (degree of hydrogenation) and 1,2-vinyl content of each partially hydrogenated polybutadiene.

Note)
Surface gloss (visual examination)
⊚: excellent
○: good
Δ: slightly similar to ground glass
x: similar to ground glass In FIG. 1 is shown the relationship between the surface gloss of the injection-molded test pieces obtained from the impact-resistant methacrylic resins and the degree of hydrogen addition (degree of hydrogenation) and 1,2-vinyl content of each partially hydrogenated polybutadiene.

EXAMPLE 8

An impact-resistant methacrylic resin was obtained by conducting polymerization in the same manner as in Example 1, except that a rubber solution was prepared by introducing 21.5 kg of toluene, 1.2 kg of the partially hydrogenated polybutadiene (H-1), 23 g of the catalyst (P-1), and 65 g of the chain transfer agent (TMTP), and that a monomer mixture was prepared from 23.4 kg of methyl methacrylate, 0.6 kg of methyl acrylate, and 47 g of the catalyst (P-2).

The conversion of the monomers into polymers was 95%, and the rubber content in the impact-resistant methacrylic resin was 5.0%.

The resin obtained had a toluene-insoluble content of 14.0% and a degree of swelling in toluene of 7.2. The weight-average particle diameter was 0.32 $\mu$m.

This resin had a melt flow index of 2.1 g/10 min, and gave injection-molded test pieces having an excellent and even surface gloss. The Izod impact strength thereof was 5.6 kg·cm/cm, and the haze thereof was 1.1%.

EXAMPLE 9

An impact-resistant methacrylic resin was obtained by conducting polymerization in the same manner as in Example 1, except that a rubber solution was prepared by introducing 16.5 kg of toluene, 6.2 kg of the partially hydrogenated polybutadiene (H-1), 23 g of the catalyst (P-1), and 65 g of the chain transfer agent (TMTP), and that a monomer mixture was prepared from 23.4 kg of methyl methacrylate, 0.6 kg of methyl acrylate, and 47 g of the catalyst (P-2).

The conversion of the monomers into polymers was 96%, and the rubber content in the impact-resistant methacrylic resin was 21.2%.

The resin obtained had a toluene-insoluble content of 40.2% and a degree of swelling in toluene of 8.5. The weight-average particle diameter was 0.41 μm.

This resin had a melt flow index of 1.2 g/10 min, and gave injection-molded test pieces having an excellent and even surface gloss. The Izod impact strength thereof was 10.3 kg·cm/cm, and the haze thereof was 3.2%.

EXAMPLE 10

An impact-resistant methacrylic resin was obtained by conducting polymerization in the same manner as in Example 1, except that a rubber solution was prepared by introducing 20.0 kg of toluene, 2.7 kg of the partially hydrogenated polybutadiene (H-1), 23 g of the catalyst (P-1), and 65 g of the chain transfer agent (TMTP), and that a monomer mixture was prepared from 22.5 kg of methyl methacrylate, 1.5 kg of ethyl acrylate, and 47 g of the catalyst (P-2).

The conversion of the monomers into polymers was 95%, and the rubber content in the impact-resistant methacrylic resin was 10.6%.

The resin obtained had a toluene-insoluble content of 23.2% and a degree of swelling in toluene of 6.6. The weight-average particle diameter was 0.42 μm.

This resin had a melt flow index of 1.9 g/10 min, and gave injection-molded test pieces having an excellent and even surface gloss. The Izod impact strength thereof was 7.3 kg·cm/cm, and the haze thereof was 1.4%.

EXAMPLE 11

An impact-resistant methacrylic resin was obtained in the same manner as in Example 2, except that when the resin obtained by treating the reaction mixture containing an impact-resistant methacrylic resin resulting from polymerization with a volatilizing apparatus to remove the solvent and remaining monomers was pelletized with an extruder, a catalyst (P-2) was additionally introduced into the extruder in an amount of 50 g/hr.

The resin obtained had a toluene-insoluble content of 21.6% and a degree of swelling in toluene of 9.8. The weight-average particle diameter was 0.35 μm.

This resin had a melt flow index of 1.7 g/10 min, and gave injection-molded test pieces having an excellent and even surface gloss. The Izod impact strength thereof was 7.3 kg·cm/cm, and the haze thereof was 2.8%.

EXAMPLE 12

Ten parts by weight of the impact-resistant methacrylic resin obtained in Example 1 was kneaded together with 90 parts by weight of a methacrylic resin (Delpet 80N, manufactured by Asahi Chemical Industry Co., Ltd.) using a twin-screw extruder at 250° C. The mixture was extruded to obtain an impact-resistant methacrylic resin. The resin obtained had a toluene-insoluble content of 2.4% and a degree of swelling in toluene of 6.5.

This resin had a melt flow index of 1.1 g/10 min, and gave injection-molded test pieces having an excellent and even surface gloss. The Izod impact strength of this resin was 3.0 kg·cm/cm, and the haze thereof was 0.9%.

POSSIBILITY OF INDUSTRIAL APPLICATION

The impact-resistant methacrylic resin of the present invention is industrially more usable in general purposes, and has not only the excellent weatherability and appearance inherent in methacrylic resins but also improved impact resistance, solvent resistance, etc. Therefore, this resin can be used extensively in indoor and outdoor applications.

What is claimed is:

1. An impact-resistant methacrylic resin comprising a methacrylic copolymer which is obtained by copolymerization of a monomer mixture comprising from 80 to 99.9% by weight methyl methacrylate and from 0.1 to 20% by weight of at least one vinyl monomer copolymerizable with methyl methacrylate, in the presence of a partially hydrogenated polymer consisting of polymerized conjugated diene units, said partially hydrogenated polymer having a degree of hydrogenation of from 20% to 70%, excluding 70%, wherein said resin has a toluene-insoluble content of from 0.5 to 50% by weight and a degree of swelling in toluene-of from 2 to 12.

2. A transparent impact-resistant methacrylic resin comprising a methacrylic copolymer which is obtained by copolymerization of a monomer mixture comprising from 80 to 99.9% by weight methyl methacrylate and from 0.1 to 20% by weight of at least one vinyl monomer copolymerizable with methyl methacrylate, in the presence of a partially hydrogenated polymer consisting of polymerized conjugated diene units, said partially hydrogenated polymer having a degree of hydrogenation of from 20% to 70%, excluding 70%, wherein said resin has a toluene-insoluble content of from 0.5 to 50% by weight and a degree of swelling in toluene of from 2 to 12.

3. The impact-resistant methacrylic resin as claimed in claims 1 or 2, wherein the partially hydrogenated conjugated diene polymer is a partially hydrogenated butadiene polymer.

4. The impact-resistant methacrylic resin as claimed in claim 3, wherein the content of remaining 1,2-vinyl units in the partially hydrogenated butadiene polymer is 1% or higher.

5. The impact-resistant methacrylic resin as claimed in claim 3, wherein the content of remaining 1,2-vinyl units in the partially hydrogenated butadiene polymer is 5% or higher.

6. The impact-resistant methacrylic resin as claimed in claim 3, wherein the partially hydrogenated butadiene polymer is one obtained by hydrogenating a butadiene polymer at a temperature of 100° C. or lower.

7. The impact-resistant methacrylic resin as claimed in claims 1 or 2, wherein the vinyl monomer is an acrylic ester.

8. The impact-resistant methacrylic resin as claimed in claim 7, wherein the acrylic ester is selected from methyl acrylate and ethyl acrylate.

9. A process for producing an impact-resistant methacrylic resin comprising solution-polymerizing a monomer mixture comprising from 80 to 99.9% by weight methyl methacrylate and from 0.1 to 20% by weight at least one other vinyl monomer copolymerizable with the methyl methacrylate, in the presence of a partially hydrogenated conjugated diene polymer having a degree of hydrogenation of from 20% to 70%, excluding 70%, and conducting volatilization after the polymerization to thereby regulate the resultant polymerization product so as to give a toluene-insoluble content of from 0.5 to 50% by weight and a degree of swelling of from 2 to 12.

10. A process for producing a transparent impact-resistant methacrylic resin comprising solution-polymerizing a monomer mixture comprising from 80 to 99.9% by weight methyl methacrylate and from 0.1 to 20% by weight at least one other vinyl monomer copolymerizable with the methyl methacrylate, in the presence of a partially hydrogenated conjugated diene polymer having a degree of hydrogenation of from 20% to 70%, excluding 70%, and conducting volatilization after the polymerization to thereby regulate the resultant polymerization product so as to give a toluene-insoluble content of from 0.5 to 50% by weight and a degree of swelling of from 2 to 12.

* * * * *